(12) United States Patent
Warren et al.

(10) Patent No.: US 10,736,328 B2
(45) Date of Patent: Aug. 11, 2020

(54) HYDRATOR

(71) Applicant: Reading Bakery Systems, Inc., Robesonia, PA (US)

(72) Inventors: Jimmy Garfield Warren, West Memphis, AR (US); Jeffrey L. Hardick, Bernville, PA (US)

(73) Assignee: Reading Bakery Systems, Inc., Robesonia, PA (US)

( * ) Notice: Subject to any disclaimer, the term of this patent is extended or adjusted under 35 U.S.C. 154(b) by 158 days.

(21) Appl. No.: 15/727,031

(22) Filed: Oct. 6, 2017

(65) Prior Publication Data

US 2019/0104742 A1  Apr. 11, 2019

Related U.S. Application Data

(60) Provisional application No. 62/405,614, filed on Oct. 7, 2016.

(51) Int. Cl.

| | |
|---|---|
| *A21C 1/00* | (2006.01) |
| *A21C 1/14* | (2006.01) |
| *B01F 7/00* | (2006.01) |
| *A21C 1/02* | (2006.01) |
| *B01F 3/12* | (2006.01) |

(Continued)

(52) U.S. Cl.
CPC .............. *A21C 1/1435* (2013.01); *A21C 1/02* (2013.01); *B01F 7/007* (2013.01); *B01F 7/00208* (2013.01); *B01F 7/00275* (2013.01); *B01F 7/00341* (2013.01); *B01F 7/00583* (2013.01); *B01F 7/00641* (2013.01); *B01F 3/1228* (2013.01); *B01F 7/16* (2013.01); *B01F 15/0203* (2013.01); *B01F 2215/0011* (2013.01)

(58) Field of Classification Search
CPC ........ B01F 3/1228; B01F 7/16; B01F 7/0208; B01F 7/0275; B01F 7/00208; B01F 7/00275; B01F 7/00341; B01F 7/00583; B01F 7/00641; B01F 7/007; B01F 15/0203; B01F 2215/0011; A21C 1/1435; A21C 1/02
See application file for complete search history.

(56) References Cited

U.S. PATENT DOCUMENTS

| | | |
|---|---|---|
| 2,333,246 A | 11/1943 | Harris |
| 3,162,536 A | 12/1964 | Kaufmann |

(Continued)

*Primary Examiner* — Anshu Bhatia
(74) *Attorney, Agent, or Firm* — Panitch Schwarze Belisario & Nadel LLP

(57) ABSTRACT

A hydrator includes a dry module with a vertically oriented tube having a central axis, an interior, an upper inlet aperture, a lower outlet, and an inlet section including a dry inlet. A mixing segment includes a vertically oriented tube having an interior wall, a mixing-segment inlet at an upper end, and a mixing-segment outlet at a lower end. The mixing segment is vertically aligned with and sealingly connected to the outlet of the dry module. A rotating hydrator shaft has a liquid channel and a longitudinal axis aligned with the central axis of the dry module. Dry blades are disposed on and rotate with the hydrator shaft in the mixing segment. A hydrator nozzle is disposed on and rotates with the hydrator shaft and has a plurality of outlets in fluid communication with the liquid channel and open to the mixing segment for discharging liquid from the liquid channel.

15 Claims, 3 Drawing Sheets

(51) Int. Cl.
  *B01F 15/02* (2006.01)
  *B01F 7/16* (2006.01)

(56) References Cited

U.S. PATENT DOCUMENTS

| | | | |
|---|---|---|---|
| 3,327,953 A | | 6/1967 | Krumhole, Sr. |
| 3,451,822 A | | 6/1969 | Fast et al. |
| 3,887,166 A | | 6/1975 | Van Ginneken |
| 3,986,705 A | | 10/1976 | Nauta |
| 4,767,217 A | | 8/1988 | Van den Brink et al. |
| 4,810,099 A | * | 3/1989 | Langsetmo ............... B01F 7/00 366/155.2 |
| 5,753,282 A | | 5/1998 | Tortosa |
| 6,319,531 B1 | | 11/2001 | Aichele et al. |
| 6,406,729 B1 | | 6/2002 | Miller et al. |
| 6,729,753 B2 | | 5/2004 | Artman et al. |
| 7,332,190 B2 | | 2/2008 | Noll |
| 8,083,395 B2 | | 12/2011 | Etzenbach |
| 2006/0003065 A1 | | 1/2006 | Kateman |
| 2015/0240148 A1 | | 8/2015 | Luharuka et al. |

\* cited by examiner

HYDRATOR

CROSS-REFERENCE TO RELATED APPLICATIONS

This application claims the benefit of priority under 35 USC § 119(e) of U.S. Provisional Patent Application No. 62/405,614 filed Oct. 7, 2016, the contents of which are incorporated herein by reference.

BACKGROUND OF THE INVENTION

The present invention relates generally to the field of food processing, and more particularly, to hydration of dry materials, which is the process of combining wet and dry ingredients in the production of doughs, batters, and pastes.

In the preparation of doughs for baking or other processing, hydration is followed by the additional steps of mixing the hydrated components into a uniform mass or dough, and further processing as needed to optimize the properties of the dough, depending on the desired finished goods being produced.

In hydration, the dry ingredients commonly include, but are not limited to, flour, yeast, sugar, salt, and the like, and the wet ingredients are generally solutions of water. With mixing and additional processing where needed, the products of hydration are used to form doughs for breads, other baked goods, and pasta, and batters for donuts and other prepared foods as well for less common foods, such as potato chips made from a "dough" of dehydrated potatoes re-hydrated with water or another liquid.

Hydration may be accomplished in batches or by a continuous process. In either case, hydration has commonly been accomplished by mechanically mixing the wet and dry ingredients together using a variety of blades, screws, and other kneading members. For example, in U.S. Pat. No. 3,986,705 ("Nauta") at FIG. 1, a device for continuously mixing and/or granulating substances includes a generally vertical vessel 1 having an inlet funnel 7a located at the top of the vessel, for admitting dry ingredients. The vessel 1 includes three sets of stirring elements 19, 25, 26 for mechanically mixing the wet and dry ingredients. After three courses of mechanical stirring, the dough leaves the vessel 1 through a lower outlet 12. A motor 9 acts though a transmission 10 to rotate a spindle 11, which extends vertically through the vessel 1. The spindle 11 has a channel 18, which is fluidly connected to a liquid source through an inlet head 32 and a spout 33. A slit 17 is fluidly connected to the channel 18 and discharges liquid from the channel 18 into the vessel 1 to be mixed with the dry ingredients. Located below the slit 17 in a vortex space 3a is a first set of stirring elements 19, which are connected to and are rotated by the spindle 11 to mechanically mix the wet and dry ingredients. Located below the vortex space 3a is a "split-spaced room" 21, which is fluidly connected to and discharges liquid from the channel 18. Located below the split-spaced room 21 is a second vortex space 3b, in which a second set of stirring elements 25 is connected to and rotated by the spindle 11 to mechanically mix the wet and dry ingredients. Located below the second vortex space 3b, near the bottom of the shaft 11, are channels 27 for discharging liquid from the channel 18 into the vessel 1, and a third set of stirring elements 29, connected to and rotated by the spindle 11 for mechanically mixing the wet and dry ingredients. Thus Nauta's device accomplishes hydration through repeated mechanical mixing of the wet and dry ingredients.

Some devices perform continuous hydration processes in which the wet and dry ingredients are combined by spraying a high-pressure liquid stream including the liquid ingredients into a mixing chamber through which the dry ingredients are conveyed or dropped.

For example, U.S. Pat. No. 7,332,190 ("Noll") discloses devices and methods for dough production. In a horizontal embodiment 12, seen in Noll's FIG. 1, dry ingredients in a flat layer are conveyed by a screw conveyor 10 into a mixing chamber 12, where a nozzle 16 sprays water at high pressure (30 to 100 bar) into the dry ingredients. In some of Noll's embodiments, compressed air is also introduced into the mixing chamber via an air nozzle 18 in order to regulate the incorporation of air into the dough. In a vertical embodiment, seen in Noll's FIG. 3, dry ingredients enter through an inlet section 32, which is a conduit with a generally rectangular cross section, and fall through the device. Below and connected to the inlet section 32 is a mixing chamber 30. Compressed air is introduced into the dry ingredients through an air nozzle 18 in a side wall of the inlet section 32. After the dry ingredients fall down past the air nozzle 18, the dry ingredients reach a slotted nozzle 36, located in a side wall of the mixing chamber 30 and spanning the width of the mixing chamber 30. The slotted nozzle 36 sprays water or other liquid into the dry ingredients at a high pressure (30 to 100 bar). The dry ingredients and the liquid combine to form a dough or paste, which falls to the bottom of the mixing chamber, exiting through a horizontal discharge 34.

The present invention described herein comprises a new hydrator for combining wet and dry ingredients for making dough, batter, pastes, and other food products. The present invention preferably thoroughly combines the wet and dry ingredients without mechanically mixing the wet and dry ingredients together, and without requiring that the wet ingredients be provided at high pressure. Preferably the fan blades and dry blades act on the dry ingredients prior to addition of the wet ingredients, with the wet agreements being added to the dry ingredients after the dry ingredients have fallen below the level of the fan blades and the dry blades, so that the fan blades and the dry blades do not mix or knead the combined liquid and dry ingredients. The present invention thus is different from Nauta, which (as explained in detail above) subjects the dough to courses of mechanical mixing after the wet ingredients have been added to the dry ingredients. The present invention preferably creates a more uniform product than prior devices, and does so more quickly, with less energy use, and with less heating of the ingredients that previous devices. The present invention preferably requires less mechanical energy than prior devices for hydration, resulting in smaller and less costly equipment, better control of temperature, and reduced costs for dough, batter, and paste production.

BRIEF SUMMARY OF THE INVENTION

Briefly stated, in a preferred embodiment of the present invention, a hydrator comprises a dry module including a vertically oriented tube having a central axis, an interior, an upper inlet aperture, a lower outlet, and an inlet section including a dry inlet. A mixing segment includes a vertically oriented tube having an interior wall, a mixing-segment inlet at an upper end thereof, and a mixing-segment outlet at a lower end thereof. The mixing segment is vertically aligned with and sealingly connected to the outlet of the dry module. A rotating hydrator shaft has a liquid channel and a longitudinal axis aligned with the central axis of the dry module. A plurality of spaced apart dry blades is disposed on and secured to rotate with the hydrator shaft in the mixing segment. A hydrator nozzle is disposed on and secured to rotate with the hydrator shaft. The hydrator nozzle has a plurality of outlets in fluid communication with the liquid channel. The outlets are open to the mixing segment of the hydrator for discharging a liquid from the liquid channel.

A method of hydration comprises providing a hydrator as described in the preceding paragraph; introducing a dry product into the dry module through the dry inlet; rotating the hydrator shaft at between 1500 and 1900 revolutions per minute, thereby rotating the dry blades in the mixing segment; supplying a liquid to the bore such that the liquid flows through plurality of outlets of the hydrator nozzle and the liquid is discharged into the mixing section of the hydrator, thereby producing a uniform, well-combined dough or paste product that has not been subjected to mechanical stirring or kneading.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
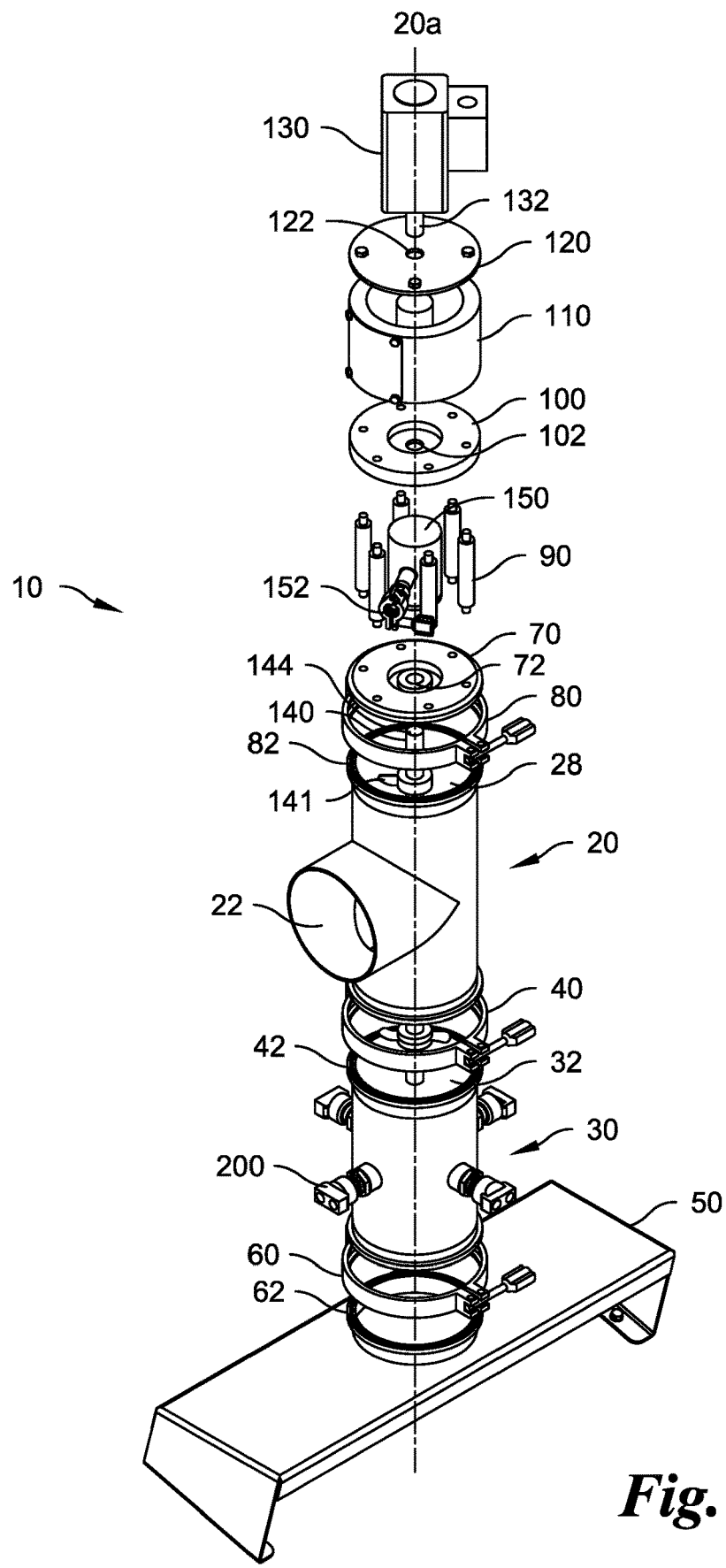
FIG. 1 is a front exploded partial perspective view of a hydrator according to a preferred embodiment of the invention.

Certain terminology is used in the following description for convenience only and is not limiting. The words "right," "left," "lower" and "upper" designate directions in the drawings to which reference is made. The words "inner" and "outer" refer to directions toward and away from, respectively, the geometric center of the device and designated parts thereof. Unless specifically set forth herein, the terms "a," "an," and "the" are not limited to one element but instead should be read as meaning "at least one." The terminology includes the words noted above, derivatives thereof and words of similar import.

Figure 2:
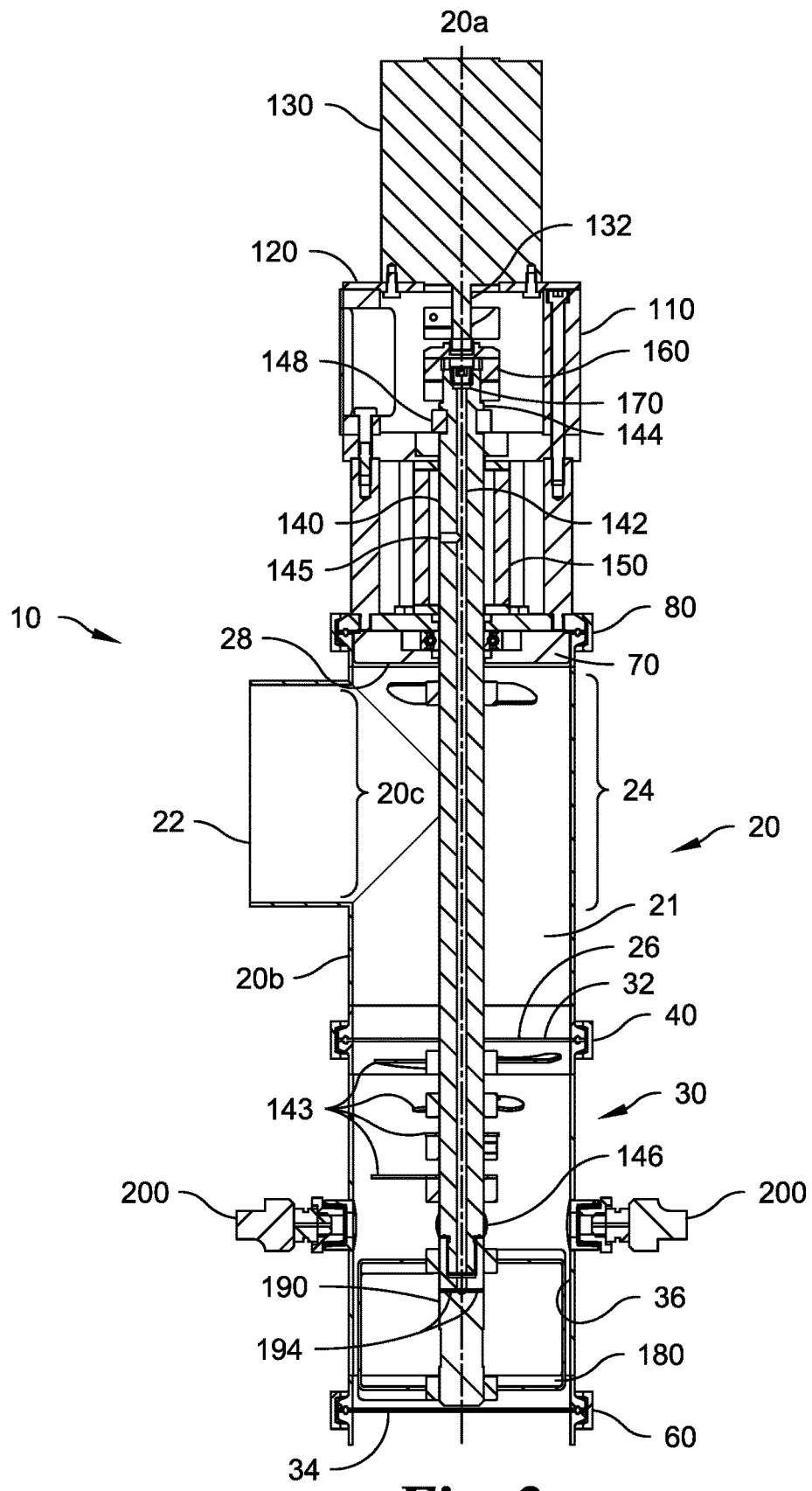
FIG. 2 is a partial sectional view of the hydrator of FIG. 1.
Figure 3:
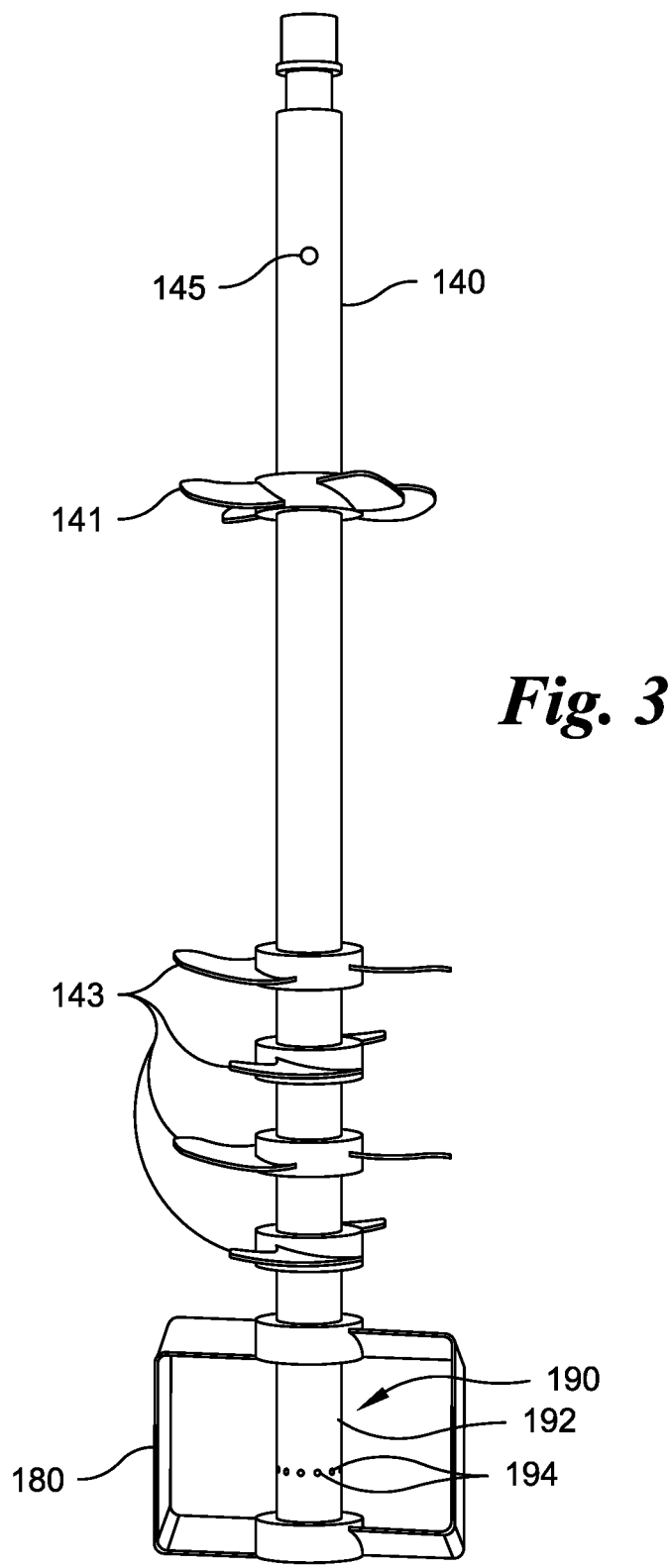
FIG. 3 is a side perspective view of the hydrator shaft of the hydrator of FIG. 1.

Referring to FIGS. 1-3, a preferred embodiment of the present invention is directed to a hydrator 10 including a dry module 20, which is preferably a generally vertically oriented tube with a central axis 20a and a dry inlet 22 located in and passing through the side wall 20b of the dry module 20 at a dry-inlet port 20c, with the dry inlet 22 leading to the interior 21 of the dry module 20. The dry module 20 includes an inlet section 24, which is the portion of the dry module 20 in which the dry inlet 22 and fan blades 141 (described below) are located. The dry module 20 also has a lower outlet 26, and an upper inlet aperture 28.

The hydrator 10 further includes a mixing segment 30, which is a generally vertically oriented tube having a mixing-segment inlet 32 at an upper end, a mixing-segment outlet 34 at a lower end, and an interior wall 36. The mixing segment 30 is vertically aligned with and sealingly connected to the outlet 26 of the dry module 20 by a clamp 40 and a gasket 42 or in some other suitable manner. The hydrator 10 further includes a conveyor mount 50, which is sealingly connected to the outlet 34 of the mixing segment 30 by a clamp 60 and a gasket 62 or in some other suitable manner and is adapted for attachment to a support frame (not shown) so that the hydrator 10 may be placed to discharge directly onto a conveyor (not shown).

The hydrator 10 preferably further includes an end cap 70, which is a generally circular plate sealingly connected to the upper inlet aperture 28 of the dry module 20 by a clamp 80 and a gasket (not shown) or in some other suitable manner. The end cap 70 has a generally circular central aperture 72.

The hydrator 10 further includes a generally circular upper bearing plate 100, which has a generally circular central aperture 102 and is preferably supported at a fixed distance above the end cap 70, preferably by a plurality of spaced support members in the form of support posts 90. The upper bearing plate 100 is preferably connected to the lower end of a generally circular housing 110 having an upper end and a lower end. The hydrator 10 preferably further includes a generally circular motor adapter plate 120 with a generally circular central aperture 122, the motor adapter plate 120 preferably being secured to the upper bearing plate 100 such that the housing 110 is clamped between the motor adapter plate 120 and the upper bearing plate 100.

The hydrator 10 preferably further includes a motor 130 with an output shaft 132 aligned with the central axis 20a of the dry module 20. The output shaft 132 protrudes downwardly into the space enclosed by the housing 110, where the output shaft 132 is connected to a hydrator shaft 140 with a liquid channel in the form of a central bore 142, an upper end 144, a lower end 146, and a central axis 20a aligned with and, as shown, in common with the central axis 20a the dry module 20. The hydrator shaft 140 is connected to the motor output shaft 132 by a clamp hub 160, and a disk insert 170 seals the bore 142 at the upper end 144. The hydrator shaft 140 extends downwardly from the upper end 144, passing through the central aperture 102 of the bearing plate 100, the central aperture 72 of the end cap 70, and along the central axis 20a of the dry module 20, extending into the mixing segment 30, with a lower end 146 extending near the outlet 34 of the mixing segment 30. The hydrator shaft 140 has a shoulder (not shown) and a collar 148 (see FIG. 2) clamped on the shoulder and sized so that, in response to a downward movement of the hydrator shaft 140, the collar 148 makes contact with the bearing plate 100 to resist the downward movement. The hydrator shaft 140 is secured and supported by roller bearings (not shown) at the bearing plate 100 and at the end cap 70.

The hydrator 10 preferably further includes a plurality (four are shown) of spaced apart fan blades 141 disposed on and secured to rotate with the hydrator shaft 140 in the inlet section 24 of the dry module 20. The fan blades 141 may be welded or otherwise secured to the hydrator shaft 140. In the preferred embodiment shown in FIGS. 1-3, the dry inlet 22 passes through dry-inlet port 22c in the side wall 22b of the dry module 20, and one or more fan blades 141 preferably are disposed above the dry-inlet port 22c, or are disposed above the level at which dry ingredients enter the dry module 20 through the dry inlet 22. Alternatively, the dry inlet 22 may be made so that dry ingredients enter the dry module 20 in a generally vertical direction through the side wall 22b or through an opening in the end cap 70. The fan blades 141 are preferably configured by being angled with respect to a longitudinal axis of the hydrator shaft 140, or otherwise shaped, so that rotation of the hydrator shaft 140 causes air to move generally downwardly through the dry module 20. The fan blades 141, which are optional but preferred, prevent the dry ingredients from traveling upward in the dry module 20. The fan blades 141 allow the hydrator 10 to run longer without becoming fouled by dry ingredients than it would be able to run in an embodiment without the fan blades 141.

The hydrator 10 preferably further includes a plurality of spaced apart dry blades 143—in the present embodiment, four dry blades 143—disposed on and secured to rotate with the hydrator shaft 140 below the fan blades 141 in the mixing segment 30, and a scraper 180 disposed on and secured to rotate with the hydrator shaft 140 at the outlet of the mixing segment 30 near the lower end 146. The dry blades 143 are preferably generally flat and are oriented generally perpendicular to the longitudinal axis 20a of the hydrator shaft 140. The dry blades 143 preferably are swept backward (curved in a backwardly sweeping fashion) with respect to a direction of rotation of the hydrator shaft 140. The scraper 180 is preferably a body sized to engage or pass near to the interior wall 36 of the mixing segment 30 to remove dough buildup from the interior wall 36 of the mixing segment 30. In a preferred embodiment, the scraper 180 is a generally rectangular frame secured to and rotating with the hydrator shaft 140 and sized to engage or pass near to an interior wall 36 of the mixing segment 30, so that when the scraper 180 rotates, the scraper 180 removes dough buildup from the interior wall 36 of the mixing segment 30.

The hydrator 10 preferably further includes a liquid reservoir 150, which is a tubular body surrounding and sealingly engaged with a portion of the exterior of the hydrator shaft 140 from the bearing plate 100 to the end cap 70, sealed to the bearing plate 100 and the end cap 70, and having a liquid inlet 152 for admitting liquid into the liquid reservoir 150. In a preferred embodiment, the hydrator shaft 140 has a liquid passage 145 disposed within the portion of the hydrator shaft 140 that is surrounded by the reservoir 150. The liquid passage 145 passes through a side wall of the hydrator shaft 140 such that the bore 142 is fluidly connected with the exterior of the hydrator shaft 140 within the liquid reservoir 150, so that a liquid under pressure in the liquid reservoir 150 flows into the bore 142. In other embodiments, other fluid connections may be used to supply liquid into the bore 142, and in certain embodiments the liquid passage 145 may be replaced with another connection supplying liquid to the bore 142.

The hydrator 10 also includes a low pressure hydrator nozzle 190 attached to the lower end 146 of the hydrator shaft 140 below the fan blades 141 (in embodiments that include fan blades 141) and preferably below at least one dry blade 143, sealed in fluid communication with the bore 142 of the hydrator shaft 140. The hydrator nozzle 190 has a periphery 192 and a plurality of outlets 194 disposed around the periphery 192, the outlets 194 being in fluid communication with the bore 142 of the hydrator shaft 140 and open to the mixing segment 30 of the hydrator for discharging a liquid from the bore (liquid channel) 142 of the hydrator shaft 140.

In a preferred embodiment, a method of hydration includes providing a hydrator 10 comprising a dry module 20 including a vertically oriented tube having a central axis 20a, an interior 21, an upper inlet aperture 28, a lower outlet 26, and an inlet section 24 including a dry inlet 22, a mixing segment 30 including a vertically oriented tube having an interior wall 36, a mixing-segment inlet 32 at an upper end thereof, and a mixing-segment outlet 34 at a lower end thereof, the mixing segment 30 being vertically aligned with and sealingly connected to the outlet 26 of the dry module 20, a rotating hydrator shaft 140 with a liquid channel in the form of a bore 142 and a longitudinal axis 20a in common with the central axis 20a of the dry module 20, a plurality of spaced apart dry blades 143 disposed on and secured to rotate with the hydrator shaft 140 in the mixing segment 30, a hydrator nozzle 190 disposed on and secured to rotate with the hydrator shaft 140 and having a plurality of outlets 194 in fluid communication with the bore 142, the outlets 194 being open to the mixing segment 30 of the hydrator 10 for discharging a liquid from the bore 142. The method further comprises introducing a dry product into the dry module 20 through the dry inlet 22; rotating the hydrator shaft 140, preferably at between 1500 and 1900 revolutions per minute, thereby rotating the dry blades 143 in the mixing segment 30; and supplying a liquid to the bore 142 such that the liquid flows through plurality of outlets 194 of the hydrator nozzle 190 and the liquid is discharged into the mixing segment 30 of the hydrator 10, thereby producing a uniform, well-combined dough or paste product that has not been subjected to mechanical stirring or kneading.

Another preferred method of hydration includes the steps recited in the preceding paragraph and further includes providing a hydrator further comprising a plurality of spaced apart fan blades 141 disposed on and secured to rotate with the hydrator shaft 140 in the inlet section 24 of the dry module 20. The dry module 20 has a side wall 20b, and the dry inlet 22 passes through the side wall 20b at a dry-inlet port 22c. A fan blade 141 is disposed above the dry-inlet port 22c, and a fan blade 141 is configured so that a rotation of the hydrator shaft 140 forces air downwardly through the dry module 20. A hydrator nozzle 190 is located below at least one dry blade 141. A scraper 180 is disposed on and secured to rotate with the hydrator shaft 140. The scraper 180 is a body sized to engage or pass near to the interior wall 36 of the mixing segment 30 to remove dough buildup from the interior wall 36 of the mixing segment 30. A liquid reservoir 150 includes a body surrounding and sealingly engaged with a portion of the hydrator shaft 140, and a liquid inlet 152 for admitting liquid into the body. A liquid passage 145 is disposed within the portion of the hydrator shaft 140 surrounded by the liquid reservoir 150. The liquid passage 145 passes through a side wall of the hydrator shaft 140 such that the liquid channel in the form of bore 142 is fluidly connected with the liquid reservoir 150, so that a liquid under pressure in the liquid reservoir 150 flows into bore 142. Rotating the hydrator shaft 140 rotates the fan blades 141 and the scraper 180. The dry product passes through the dry-inlet port 22c, and the supplying step comprises supplying the liquid to the liquid reservoir 150.

The claimed hydrators and methods do not require mechanical stirring our kneading, but naturally the claimed hydrators and methods do not preclude subsequent mechanical stirring or kneading of the dough or paste product produced by the claimed hydrators or methods.

In use, in a preferred embodiment of the hydrator, the motor 130 rotates the output shaft 132, which in turn rotates the hydrator shaft 140 and the fan blades 141 and the dry blades 143, the scraper 180, and the hydrator nozzle 190 at 900 to 3600 rpm. Dry ingredients enter the dry module 20 through the dry inlet 22. The dry ingredients fall downwardly through the dry module and are aerated and broken up by the dry blades 143. The dry ingredients continue downwardly through water streams exiting through the outlets 194 in the hydrator nozzle 190. Liquid, which is not under high pressure but preferably is pumped and metered and delivered in a controlled fashion, enters the hydrator 10 through the liquid inlet 152. The liquid flows into the reservoir 150, through the liquid passage 145, into the bore 142, down through the hydrator shaft 140, and into the hydrator nozzle 190, exiting the shaft through the outlets 194. The liquid exiting the outlets 194, which move due to the rotation of the hydrator shaft 140, creates a liquid spray that hydrates the dry ingredients falling past the outlets 194 to create a dough product, which is a hydrated dough or paste. The dough product then falls to the bottom end of the hydrator 10, exiting through the outlet 34. The operation of the hydrator 10 creates a uniform, well-combined dough or paste product without employing mechanical stirring to combine the wet and dry ingredients.

Because the hydrator 10 is intended for use in processing food for human consumption, in preferred embodiments, the hydrator 10 is constructed from materials that are approved for use in food-processing devices and have sufficient strength, wear resistance, and corrosion resistance to be durable in this application. For example, the dry module 20, the mixing segment 30, the end cap 70, the hydrator shaft 140, the disk insert 170, the scraper 180, and the hydrator nozzle 190 preferably are made from stainless steel or other food-grade materials. The gaskets preferably are sanitary gaskets made from Buna N; alternatively, other sanitary gaskets may be used.

In a preferred embodiment, a system using a dry module 20 with a diameter of 6 inches has been effective when used with a hydrator shaft 140 with an outer diameter of 30 mm, a bore 142 with a diameter of ¼ inch, and twelve outlets 194, each 1/16 inch in diameter. In a preferred embodiment, the motor 130 is a 90V, ⅛ HP, 3500 RPM capacity motor and is preferably operated at a speed of around 1700 RPM. In a preferred embodiment, water or other liquid is supplied to the liquid reservoir 150 by a water pump (not shown) at a rate of 1 pound per hour up to 2000 pounds per hour at low pressure (below about 20 bar). The preferred embodiment produces a uniform, well-combined dough product that has not been subjected to mechanical stirring or kneading.

In alternative embodiments, one or more of the dry module 20, the mixing segment 30, the end cap 70, the discharge 34, and the conveyor mount 50 are welded or otherwise attached to one another rather than being attached by clamps. In certain embodiments, pressurized air or other gas or liquids at low pressure is introduced through nozzles 200, which may be located vertically near the hydrator nozzle 190. In certain embodiments, one or more of the fan blades 141, dry blades 143, and scraper 180 are secured to the hydrator shaft 140 using screws or other mechanical fasteners; in other embodiments, welding or adhesives may be used, or the one or more of the fan blades 141, dry blades 143, and scraper 180 may be integrally formed with the hydrator shaft 140.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A hydrator comprising:
    a dry module including a vertically oriented tube having a central axis, an interior, an upper inlet aperture, a lower outlet, and an inlet section including a dry inlet;
    a mixing segment including a vertically oriented tube having an interior wall, a mixing-segment inlet at an upper end thereof, and a mixing-segment outlet at a lower end thereof, the mixing segment being vertically aligned with and sealingly connected to the outlet of the dry module;
    a rotating hydrator shaft with a liquid channel and a longitudinal axis aligned with the central axis of the dry module;
    a plurality of spaced apart dry blades disposed on and secured to rotate with the hydrator shaft in the mixing segment; and
    a hydrator nozzle disposed on and secured to rotate with the hydrator shaft and having a plurality of outlets in fluid communication with the liquid channel, the outlets being open to the mixing segment of the hydrator for discharging a liquid from the liquid channel, the hydrator nozzle and the outlets thereof being located below each of the plurality of spaced apart dry blades.

2. A hydrator comprising:
    a dry module including a vertically oriented tube having a central axis, an interior, an upper inlet aperture, a lower outlet, and an inlet section including a dry inlet;
    a mixing segment including a vertically oriented tube having an interior wall, a mixing-segment inlet at an upper end thereof, and a mixing-segment outlet at a lower end thereof, the mixing segment being vertically aligned with and sealingly connected to the outlet of the dry module;
    a rotating hydrator shaft with a liquid channel and a longitudinal axis aligned with the central axis of the dry module;
    a plurality of spaced apart dry blades disposed on and secured to rotate with the hydrator shaft in the mixing segment;
    a hydrator nozzle disposed on and secured to rotate with the hydrator shaft and having a plurality of outlets in fluid communication with the liquid channel, the outlets being open to the mixing segment of the hydrator for discharging a liquid from the liquid channel; and
    a plurality of spaced apart fan blades disposed on and secured to rotate with the hydrator shaft in the inlet section of the dry module.

3. The hydrator of claim 2, wherein the dry module has a side wall, the dry inlet passes through the side wall at a dry-inlet port, and a fan blade is disposed above the dry-inlet port.

4. The hydrator of claim 2, wherein a fan blade is configured so that a rotation of the hydrator shaft forces air downwardly through the dry module.

5. The hydrator of claim 2, wherein the hydrator nozzle is located below at least one dry blade.

6. The hydrator of claim 1, further comprising a scraper disposed on and secured to rotate with the hydrator shaft, the scraper being a body sized to engage or pass near to the interior wall of the mixing segment to remove dough buildup from the interior wall of the mixing segment.

7. The hydrator of claim 1, wherein the hydrator shaft has a direction of rotation and a dry blade is swept backward with respect to the direction of rotation.

8. The hydrator of claim 4, wherein the hydrator shaft has a direction of rotation and a dry blade is swept backward with respect to the direction of rotation.

9. The hydrator of claim 2, wherein the dry module has a side wall, the dry inlet passes through the side wall at a dry-inlet port, and at least one fan blade is disposed above the dry-inlet port, and
    wherein at least one fan blade is configured so that rotation of the hydrator shaft forces air downwardly through the dry module, wherein the hydrator nozzle is located below at least one dry blade, and further comprising:
a scraper disposed on and secured to rotate with the hydrator shaft, the scraper being a body sized to engage or pass near to the interior wall of the mixing segment to remove dough buildup from the interior wall of the mixing segment;
a liquid reservoir including a body surrounding and sealingly engaged with a portion of the hydrator shaft and a liquid inlet; and
a liquid passage disposed within the portion of the hydrator shaft encircled by the reservoir, the liquid passage passing through a side wall of the hydrator shaft such that the bore is fluidly connected with the liquid reservoir, so that a liquid under pressure in the reservoir flows into the bore.

10. The hydrator of claim 9, further comprising:
an end cap sealingly connected to the upper inlet aperture of the dry module;
an upper bearing plate having a central aperture;
a plurality of spaced support members supporting the upper bearing plate at a distance above the end cap;
a housing having an upper end and a lower end, the lower end being connected to the upper bearing plate;
a motor adapter plate having an central aperture and being secured to the upper bearing plate such that the housing is clamped between the motor bearing plate and the upper bearing plate;
a motor including an output shaft aligned with the central axis of the dry module, the output shaft being connected to the hydrator shaft for rotation thereon; and
a sealing member sealing the bore of the hydrator shaft.

11. A hydrator comprising:
a dry module including a vertically oriented tube having a central axis, an interior, an upper inlet aperture, a lower outlet, and an inlet section including a dry inlet;
a mixing segment including a vertically oriented tube having an interior wall, a mixing-segment inlet at an upper end thereof, and a mixing-segment outlet at a lower end thereof, the mixing segment being vertically aligned with and sealingly connected to the outlet of the dry module;
a rotating hydrator shaft with a liquid channel and a longitudinal axis aligned with the central axis of the dry module;
a plurality of spaced apart dry blades disposed on and secured to rotate with the hydrator shaft in the mixing segment;
a hydrator nozzle disposed on and secured to rotate with the hydrator shaft and having a plurality of outlets in fluid communication with the liquid channel, the outlets being open to the mixing segment of the hydrator for discharging a liquid from the liquid channel; and
a liquid reservoir including a body surrounding and sealingly engaged with a portion of the hydrator shaft, and a liquid inlet for admitting liquid into the body,
wherein the hydrator shaft has a liquid passage disposed within the portion of the hydrator shaft surrounded by the liquid reservoir, the liquid passage passing through a side wall of the hydrator shaft such that the liquid channel is fluidly connected with the liquid reservoir, so that a liquid under pressure in the liquid reservoir flows into the liquid channel.

12. The hydrator according to claim 11, further comprising a plurality of spaced apart fan blades disposed on and secured to rotate with the hydrator shaft in the inlet section of the dry module.

13. A method of hydration, comprising:
providing a hydrator comprising:
a dry module including a vertically oriented tube having a central axis, an interior, an upper inlet aperture, a lower outlet, and an inlet section including a dry inlet;
a mixing segment including a vertically oriented tube having an interior wall, a mixing-segment inlet at an upper end thereof, and a mixing-segment outlet at a lower end thereof, the mixing segment being vertically aligned with and sealingly connected to the outlet of the dry module;
a rotating hydrator shaft with a liquid channel and a longitudinal axis aligned with the central axis of the dry module;
a plurality of spaced apart dry blades disposed on and secured to rotate with the hydrator shaft in the mixing segment; and
a hydrator nozzle disposed on and secured to rotate with the hydrator shaft and having a plurality of outlets in fluid communication with the liquid channel, the outlets being open to the mixing segment of the hydrator for discharging a liquid from the liquid channel, the hydrator nozzle and the outlets thereof being located below each of the plurality of spaced apart dry blades;
introducing a dry product into the dry module through the dry inlet;
rotating the hydrator shaft at between 1500 and 1900 revolutions per minute, thereby rotating the dry blades in the mixing segment;
supplying a liquid to the bore such that the liquid flows through plurality of outlets of the hydrator nozzle and the liquid is discharged into the mixing section of the hydrator,
thereby producing a uniform, well-combined dough or paste product that has not been subjected to mechanical stirring or kneading.

14. A method of hydration according to claim 13, wherein the hydrator further comprises a plurality of spaced apart fan blades disposed on and secured to rotate with the hydrator shaft in the inlet section of the dry module,
wherein the dry module has a side wall, the dry inlet passes through the side wall at a dry-inlet port, and a fan blade is disposed above the dry-inlet port,
wherein a fan blade is configured so that rotation of the hydrator shaft forces air downwardly through the dry module, and
wherein the hydrator nozzle is located below at least one dry blade, and
wherein the hydrator further comprises:
a scraper disposed on and secured to rotate with the hydrator shaft, the scraper being a body sized to engage or pass near to the interior wall of the mixing segment to remove dough buildup from the interior wall of the mixing segment;
a liquid reservoir including a body surrounding and sealingly engaged with a portion of the hydrator shaft, and a liquid inlet for admitting liquid into the body; and
a liquid passage disposed within the portion of the hydrator shaft surrounded by the liquid reservoir, the liquid passage passing through a side wall of the hydrator shaft such that the liquid channel is fluidly connected with the liquid reservoir, so that a liquid under pressure in the liquid reservoir flows into the liquid channel;

wherein rotating the hydrator shaft rotates the fan blades and the scraper;

wherein the dry product passes through the dry-inlet port; and wherein the supplying step comprises supplying the liquid to the liquid reservoir.

15. A method of hydration according to claim 13, wherein the hydrator further comprises a plurality of spaced apart fan blades disposed on and secured to rotate with the hydrator shaft in the inlet section of the dry module.

* * * * *